(12) United States Patent
Okamoto et al.

(10) Patent No.: US 6,543,419 B2
(45) Date of Patent: Apr. 8, 2003

(54) FUEL INJECTION SYSTEM FOR INTERNAL COMBUSTION ENGINE

(75) Inventors: Yoshio Okamoto, Minori (JP); Yuzo Kadomukai, Ishioka (JP); Ayumu Miyajima, Narita (JP); Masami Nagano, Hitachinaka (JP); Tadashi Someno, Hitachinaka (JP)

(73) Assignees: Hitachi, Ldt., Tokyo (JP); Hitachi Car Engineering Co., Ltd., Hitachinaka (JP)

(*) Notice: Subject to any disclaimer, the term of this patent is extended or adjusted under 35 U.S.C. 154(b) by 0 days.

(21) Appl. No.: 09/805,168

(22) Filed: Mar. 14, 2001

(65) Prior Publication Data

US 2001/0023686 A1 Sep. 27, 2001

(30) Foreign Application Priority Data

Mar. 15, 2000 (JP) ........................................ 2000-077774

(51) Int. Cl.$^7$ ............................ F02D 41/20; F02M 61/14
(52) U.S. Cl. ........................................ 123/442; 123/490
(58) Field of Search ................................. 123/478, 490, 123/442, 445, 472

(56) References Cited

U.S. PATENT DOCUMENTS 6,032,652 A * 3/2000 Nozawa et al. ............. 123/478

FOREIGN PATENT DOCUMENTS

JP          5126012          5/1993

\* cited by examiner

Primary Examiner—Andrew M. Dolinar
(74) Attorney, Agent, or Firm—Antonelli, Terry, Stout & Kraus, LLP (57) ABSTRACT

In a multi-port fuel injection system for a lean burn engine, the attaching of fuel particles from the fuel spray onto a wall surface, which is a problem in atomizing injected fuel, is reduced, and the quality and shape of the mixed gas in the cylinders of the engine is improved. The engine has a fuel injector 1; an intake valve 6 for opening and closing an intake port; and an intake air flow control device 10. The injected fuel is shaped to provide a low penetration fuel spray when the engine is operated in a low load state and at a low rotation speed, and the injected fuel is shaped to provide a high penetration fuel spray when the engine is operated in a high load state and at a high rotation speed. The fuel is injected in synchronism with the intake stroke of the engine, and it is transported by the air flow flowing through the intake air flow control device 10 to suppress the attaching of fuel particles from the fuel spray onto a wall surface of the intake manifold.

16 Claims, 6 Drawing Sheets

LOW LOAD/LOW ROTATION SPEED

FIG. 1(a)

LOW LOAD/LOW ROTATION SPEED

FIG. 1(b)

HIGH LOAD/HIGH ROTATION SPEED

FUEL INJECTION SYSTEM FOR INTERNAL COMBUSTION ENGINE

BACKGROUND OF THE INVENTION

The present invention relates to a fuel injection system for an internal combustion engine; and, more particularly, the invention relates to a technology for controlling fuel to prevent it from attaching onto a wall surface of an intake manifold by controlling the projection and penetration of the fuel spray (fuel spray travel distance).

A known conventional fuel injection system is disclosed in Japanese Patent Application Laid-Open No. 5-126012. In this publication, it is described that, since the speed of rotation of an engine is low and the closing time of the intake valve is relatively long when the engine is operated in a low speed range, such as during starting operation or idling operation, the fuel spray from a fuel injector of the electromagnetic type is preferably suspended inside the intake manifold, and the penetration force of the fuel spray is preferably weak and the fuel becomes fine liquid droplets.

It is also described in the above-referenced publication that, on the other hand, since the speed of rotation of the engine is high and the closing time of the intake valve is relatively short as the speed of rotation of the engine is brought from a middle speed range to a high speed range, the fuel spray must be rapidly supplied to the combustion chamber without becoming attached onto the inner wall surface of the intake manifold, and, accordingly, the penetration force of the spray needs to be strong.

In the system described in the above-referenced publication, the electronic fuel injection system of a multi-point injection type for controlling an internal combustion engine has an electromagnetic fuel injector for injecting fuel toward a rear dish-shaped portion of the intake valve for each cylinder. In this system, the shape of the fuel spray is varied depending on the operating condition of the engine by detecting the operating condition of the engine and by driving a fuel spray shape varying means of the electromagnetic fuel injector using a signal representing the detected operating condition.

The system varies the fuel spray shape by controlling the ratio of a swirl fuel component to a non-swirl fuel component in the injected fuel spray. The swirl force of the swirl fuel component is added when the fuel passes through a fuel passage (groove) for introducing an eccentrically to the direction of fuel flow along an axis, the fuel passage being formed in a fuel swirling element.

On the other hand, the non-swirl component is represented by fuel passing through a gap between an inner peripheral surface of the fuel swirling element and a ball which represents the valve body. For example, when the size of the gap is increased, the amount of fuel leaking through the gap is increased to increase the non-swirl component, and the fuel spray takes on a shape having a small injection angle, which is suitable for high speed operation of the engine.

In the system described above, a piezoelectric element is used to vary the size of the gap between the inner peripheral surface of the fuel swirling element and the ball which represents the valve body. Therefore, the fuel spray shape varying means using the piezoelectric element needs to be formed in a very narrow space of a nozzle end portion of the fuel injector, which causes a problem of improving the productivity.

Further, it is necessary to take the wiring to the piezoelectric element into consideration. In addition, the problem of reliability, such as a change in the characteristic and the durability of the piezoelectric element, should be considered.

In the above-mentioned publication, no consideration is given to a system for injecting fuel so as to coordinate the timing of fuel injection with the timing of the intake stroke. A lean burn engine is an engine in which a lean mixed gas is burned, and the mixed gas is made lean by employing a fuel injection method in which fuel is injected from a fuel injector provided in each cylinder (multi-point injection system: MPI) and by performing fuel injection in synchronism with the intake stroke.

In a fuel injection system required to perform fuel injection in synchronism with the intake stroke, for example, in an engine as described above, the time lag (transport lag) until the injected fuel spray reaches the inside of the cylinder becomes a problem. In a case where the penetration force of the fuel spray is varied, the time until the fuel spray reaches the inside of the cylinder is different between a fuel spray having a high penetration and a fuel spray having a low penetration. Therefore, it is necessary to take the transport lag of the fuel spray into consideration.

SUMMARY OF THE INVENTION

A first object of the present invention is to make it possible to control the penetration of a fuel spray without large modification of the fuel injector.

A second object of the present invention is to reduce the transport lag of the fuel spray even when the penetration of fuel spray is varied.

In order to attain the above first object, the swirl velocity component and the axial velocity component of the fuel are varied by controlling the rising or lifting speed of the valve body of the fuel injector. In detail, by increasing a speed of opening of the valve so as to rapidly increase the swirl force of the fuel, the swirl velocity component of the fuel is strengthened and the axial velocity component is weakened. By doing so, a fuel spray having a small penetration force (a low penetration fuel spray) can be obtained.

On the other hand, by decreasing the speed of opening of the valve, thereby gradually increasing the swirl force of the fuel, at the initial stage of the fuel injection, the swirl velocity component of the fuel is weakened and the axial velocity component is strengthened. By doing so, a fuel spray having a large penetration force (a high penetration fuel spray) can be obtained. Because the method does not require a modification of the structure and does not cause complexity in the constitution of internal parts, the method described above has the advantages of providing a very low cost and an improvement in the reliability compared to a method based on mechanical operation.

In order to attain the above second object, the intake air velocity is changed, corresponding to whether a high penetration fuel spray or a low penetration fuel spray is to be provided, by varying the cross-sectional area of the air intake passage in the intake manifold upstream of the fuel injector. In detail, in the case of a low penetration fuel spray in which the fuel spray can reach only a position upstream of the intake valve, the transport lag of the fuel spray is reduced by increasing the velocity of the intake air flow velocity.

Increasing the intake air flow velocity may be performed by decreasing the cross-sectional area of the intake air passage. In that case, the intake air flow in a bending passage of the intake manifold is guided on a passage wall side opposite to a position in the intake manifold where the fuel injector is arranged. Thereby, it is possible to prevent the fuel spray from attaching onto the passage wall on the opposite side of the position in the intake manifold where the fuel injector is arranged, or to reduce the amount of fuel spray attaching onto the passage wall.

BRIEF DESCRIPTION OF DRAWINGS

FIGS. 1(a) and 1(b) are partial cross-sectional views showing a cylinder of a multi-cylinder internal combustion engine in which a fuel injector of the present invention is mounted, wherein FIG. 1(a) shows flow of a fuel spray and intake air in a case where the engine is in a low load and low rotation speed operating state, and FIG. 1(b) shows flow of a fuel spray and intake air in a case where the engine is in a high load and high rotation speed operating state;

DESCRIPTION OF THE PREFERRED EMBODIMENTS OF THE INVENTION

An embodiment of a fuel injection system for an internal combustion engine in accordance with the present invention will be described in detail with reference to the accompanying drawings. Initially, the overall construction of the engine control system comprising an embodiment of the fuel injection system (the fuel injector 1) in accordance with the present invention will be described with reference to FIG. 2.

Figure 2:
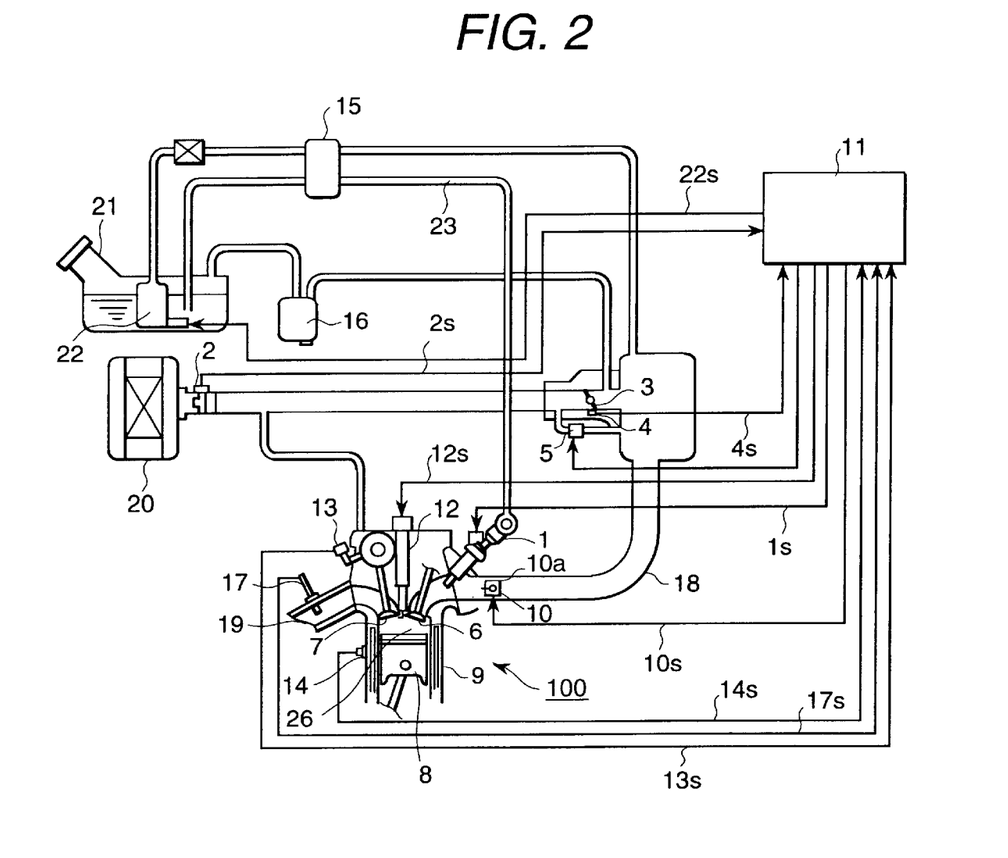
FIG. 2 is a diagram showing the overall construction of an embodiment of a control system of an engine in which a fuel injector in accordance with the present invention is mounted.

In each of the cylinders 9 of an internal combustion engine 100 composed of four cylinders (only one of the four cylinders is illustrated in the figure), a combustion chamber is formed by a cylinder 9, at the upper end of which there is arranged an ignition plug 12, an intake valve 6 and an exhaust valve 7, and a piston 8 is mounted for reciprocal movement in the cylinder 9. In this embodiment, the engine is a 4-cylinder engine, but the number of cylinders is not limited to four. At each of the cylinders 9, an intake manifold 18 and an exhaust manifold 19, which are opened and closed by the intake valve 6 and the exhaust valve 7, respectively, are arranged. In the intake manifold 18, an intake air flow sensor 2 is provided for measuring the mass flow rate of intake air, which sensor is one of the operating state detecting means, and a throttle sensor 4 is provided for measuring the opening degree of a throttle valve 3.

Further, a cooling water sensor 14 is provided for measuring the temperature of the cooling water of the engine, and a crank angle sensor 13 is provided for measuring the rotation speed of the engine. Air flowing through an air cleaner 20 provided upstream of the intake manifold 18 is controlled as to its flow rate by the throttle valve 3, and the intake air is mixed with gasoline injected with an appropriate fuel spray characteristic from each of the fuel injectors 1 of the fuel injection system so that fuel is supplied to each of the cylinders 9. The fuel injectors 1 are individually arranged upstream of the cylinders 9 of the 4-cylinder internal combustion engine 100 to form a multi-point injection (MPI) system.

On the other hand, fuel from a fuel tank 21 is pumped up and pressurized by a fuel pump 22, and then the fuel is conducted to a fuel inlet of the fuel injector 1 through a fuel pipe 23 having a pressure regulator 15. The fuel conducted to the fuel injector 1 is controlled to a constant fuel pressure by a fuel pressure regulator 16, and the extra fuel is returned to the fuel tank 21.

Exhaust gas burned in each of the cylinders 9 is conducted to a catalytic converter (not shown) through an exhaust manifold 19 so as to be cleaned and then exhausted. In the exhaust manifold 19, there is arranged an air-fuel ratio sensor 17 for use in outputting a wide-range and linear air-fuel ratio signal in proportion to the detected oxygen concentration in the exhaust gas.

An output signal 2s indicating an amount of intake air obtained from the intake air flow sensor 2, an output signal 4s from the throttle sensor 4, and signals 14s, 13s and 17s from the cooling water sensor 14, the crank angle sensor 13 and the air-fuel ratio sensor 17, respectively, are input to an engine control unit (control unit C/U) 11 as electric signals representing the operating state of the internal combustion engine 100.

The control unit 11 is mounted in the vehicle body or the engine compartment, and it executes necessary calculation processing based on the electric signals indicating the operating state of the internal combustion engine 100 as received from the various sensors. The control unit 11 outputs signals for performing operations to open and close the fuel injector 1 for injecting and supplying fuel, to drive the ignition plug 12, and to open and close an idle speed control valve (ISC) 5 for effecting control so that the rotation speed of the engine at idling operation may become a target rotation speed in order to perform optimum control of the operating state, and, at the same time, it controls the fuel pump 22 and a swirl control valve drive unit 10.

Further, the control unit 11 outputs a command signal to perform fuel injection to each of the cylinders 9 so as to synchronize the timing of fuel injection with the intake stroke of each of the cylinders 9. The control unit 11 is composed of an I/O device, such as an input/output interface, a calculation processor unit MPU, memory units RAM and ROM for storing a plurality of control programs, a timer counter and so on.

In the control unit 11, a fuel injection amount setting means operates to execute a calculation based on a control program using the calculation processing unit MPU, which includes calculating a required fuel amount to be supplied to the cylinder 9 from the fuel injector 1 based on the detected intake air flow rate and a set air-fuel ratio, and calculating a required injection pulse width (a valve opening time period of the fuel injector 1) based on the required fuel amount, a flow rate gradient and an ineffective injection pulse width of the injection amount characteristic of the fuel injector 1, thereby to output a drive signal 1s, so that the fuel injector 1 may perform valve opening for the time period of the injection pulse based on the required injection pulse width.

Further, the fuel injection amount setting means operates to execute a calculation based on a control program using the calculation processing unit MPU, which includes calculating an injection timing of the fuel injector 1 based on the intake air amount and the engine rotation speed and so on to synchronize with the intake stroke of the internal combustion engine 100, and, at the same time, sets the fuel injection timing during the intake stroke to the optimum timing. Based on the timing, the fuel injection amount setting means outputs drive signals 1s, 12s, 10s to the fuel injector 1, the ignition plug 12 and the swirl control valve drive unit 10, respectively.

The swirl control valve drive unit 10 is a unit for opening and closing a swirl control valve (SCV) 10a, which operates as an air flow speed accelerating means for generating a tumble flow (tumble swirl), and which is arranged upstream of the fuel injector 1. The SCV 10a makes the flow passage area (cross-sectional area of the flow passage) of the intake manifold 18 narrow by being driven in a closed direction, thereby to increase the velocity of air by the tumble swirl. More particularly, the SCV 10a is a movable member for varying the area of the flow passage of the intake manifold so as to form an opening-and-closing device for opening and closing part of the flow passage.

Therein, in order that the optimum mixed gas is formed by the MPI system to improve the combustion in an internal combustion engine 100 having the fuel injector 1, attachment of the injected fuel onto the wall surface of the intake manifold is suppressed to eliminate or reduce the time lag of the fuel reaching the cylinder 9 and to improve the quality and shaping state of the mixed gas inside the cylinder 9.

The time lag of the fuel reaching the cylinder 9 is composed of a transport lag of the injected fuel from the time point when the fuel is injected from the fuel injector 1 to the time point when the fuel is actually taken in the cylinder 9, and a calculation and processing lag from the time point when the required injection amount is calculated on the basis of the intake air flow rate detected by the intake air flow sensor 2 and so on to the timing when the fuel is injected from the fuel injector 1.

In order to solve the problems produced by the time lag of the injected fuel, it is necessary for the fuel injector 1 to inject the fuel in synchronism with the intake stroke of the cylinder 9 based on new data provided by the intake air flow sensor 2 and for all of the fuel injected by the fuel injector 1 to be taken in the cylinder 9 in the intake stroke. Therefore, the injection of fuel by the fuel injector 1 must be completed at an appropriate timing of the intake stroke of the cylinder 9. That is, injection must be such that all of the fuel injected through the fuel injector 1 has been taken into the cylinder 9 during the short time period from opening to closing of the intake valve 6. In that case, taking the fuel injection time period (the injection pulse width) into consideration, it is necessary to prevent the injected fuel from attaching onto the inner wall surface of the intake manifold 18.

Further, the quality and shape of the mixed gas inside the cylinder 9 is such that the mixed gas is formed in a lean state, and only a flammable and dense mixed gas is gathered around the ignition plug. One of the effective means to improve the quality and shape of the mixed gas is to develop the atomizing of the injected fuel. Since the kinetic energy of atomized injected fuel is smaller than that of a fuel spray having a normal droplet size, the atomized injected fuel takes a longer time to travel to the cylinder 9.

Therefore, in order to avoid such longer time travel of the fuel, by the synergistic effect of a kinetic energy control means for the atomized fuel (a means for controlling penetration of the fuel spray) and a fuel injection timing setting means, an injection timing for shaping a further optimum mixed gas state is set within the fuel injection timing during the intake stroke so that only a flammable and dense mixed gas is gathered around the ignition plug 12, thereby to improve the quality of the mixed gas.

Figure 1A:
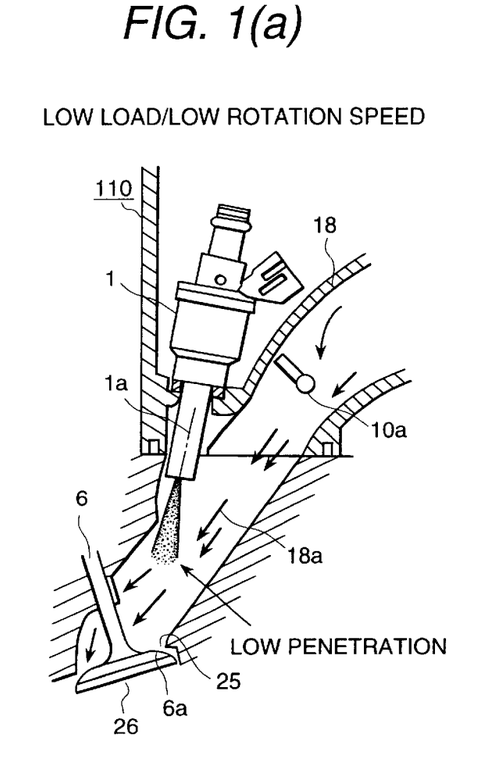
Figure 1B:
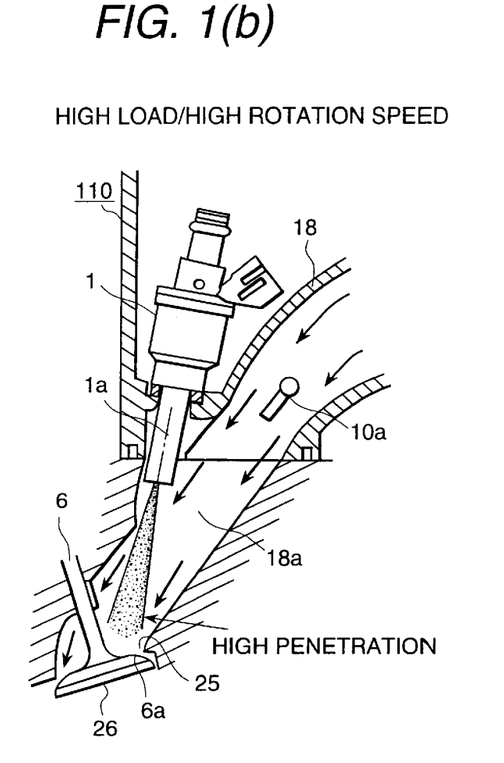

FIGS. 1(*a*) and 1(*b*) are partial cross-sectional views showing the fuel injector 1 mounted on a multi-cylinder internal combustion engine, and illustrating the shapes of the mixed gas which can be formed in the present embodiment.

The intake manifold has a bent passage on the upstream side of the valve seat of the intake valve, and the shaft of the intake valve is inserted through the passage wall in the outer side of the bent passage. The fuel injector 1 is arranged on the upstream side of the position where the shaft of the intake valve is located so that the fuel spray may be injected into the intake manifold from the passage wall on the outer side.

The swirl control valve 10a is arranged at a position upstream of the position where the fuel spray is injected into the intake manifold from the fuel injector, and it is disposed so as to open and close the passage from the center of the intake manifold to the side where the fuel injector is disposed. That is, about a half of the total cross-sectional area of the passage can be opened and closed.

FIG. 1(*a*) shows the intake air flow in the intake manifold 18 and an example of the shape of fuel spray from the fuel injector 1(in a state that the kinetic energy of the fuel spray is small, that is, in a state of a low penetration fuel spray having a small penetrating force) in a case where the internal combustion engine 100 is operating in a low load and low rotation speed state.

On the other hand, FIG. 1(*b*) shows the intake air flow in the intake manifold 18 and the shape of fuel spray from the fuel injector 1(in a state that the kinetic energy of the fuel spray is large, that is, in a state of a high penetration fuel spray having a large penetrating force) in a case where the internal combustion engine 100 is operating in a high load and high rotation speed state.

The reference character 110 indicates one of the cylinders 9 of the multi-cylinder internal combustion engine; the reference character 6 indicates the intake valve provided for opening and closing the intake port 25; the reference character 6a indicates the rear dish-shaped portion of the intake valve 6; the reference character 10a indicates the swirl control valve; the reference character 18 indicates the intake manifold; the reference character 18a indicates the intake air flow; and the reference character 26 indicates the combustion chamber.

Therein, the operating state of the internal combustion engine 100 is obtained by necessary calculation processing based on the electric signals output from various kinds of sensors mounted on the vehicle body or in the engine compartment. The low load and low rotation speed state in the present embodiment is a state within a range of engine water temperature of 20 to 30° C. and a range of engine rotation speed of 1000 to 2000 rpm relative to an engine water temperature of 80° C. and an engine rotation speed of 600 to 900 rpm, that is, a state of what is called idle operation within the above target engine rotation speed.

On the other hand, the high load and high rotation speed state is a state in which the throttle valve 3 is almost fully opened. In that state, the pressure in the intake manifold 18 is within a range of 81 kPa to 101 kPa (atmospheric pressure). On the other hand, during idling operation, the pressure in the intake manifold 18 is within a range of 28 kPa to 41 kPa.

As shown in FIG. 1(a), when the shape of the fuel spray from the fuel injector 1 is such as to provide a low penetration fuel spray having a small penetration force in which the front end of the fuel spray is positioned near the center of the intake manifold 18, the fuel is transported into the combustion chamber 26 by being conveyed on the intake air flow, the velocity of which is increased along the wall side opposite to the fuel spray. The velocity-increased intake air flow is formed when the swirl control valve 10a closes the portion of the passage from the center of the intake manifold to the side where the fuel injector 1 is arranged (one-half of the total area of the passage).

On the other hand, as shown in FIG. 1(b), when the shape of the fuel spray from the fuel injector 1 is such as to provide a high penetration fuel spray having a large penetration force in which the front end of the fuel spray is formed close to the dish-shaped portion 6a of the intake valve 6, the fuel spray penetrates through the intake air flow flowing around the front end 1a of the fuel injector 1 so as to be transported into the combustion chamber 26.

According to the construction described above, by provision of the high penetration fuel spray in the high load and high rotation speed state, or by increasing the velocity of the intake air flow in the low load and low rotation speed state, the atomized injected fuel can be transported into the cylinder 9 without increasing the time period of the fuel traveling to the combustion chamber 26. Therefore, the fuel injection can be completed within the intake stroke, and only a flammable dense mixed gas will be gathered around the ignition plug 12.

Further, since the swirl control valve 10a closes the portion of the passage on the side where the fuel injector 1 is arranged so as to guide the intake air flow to the passage wall side opposite to the side on which the fuel injector 1 is arranged, a fuel spray having a wide spray angle caused by the low penetration fuel spray can be prevented from attaching onto the passage wall on the side opposite to the fuel injector 1.

A description will be given of examples of the structure and the operation of a fuel injector 1 which is capable of forming such fuel sprays as described above, with reference to FIG. 3(a), which is a cross-sectional view showing the fuel injector 1, and FIG. 3(b), which is a cross-sectional view showing the fuel injector as seen on the plane of the line I—I in FIG. 3(a).

Figure 3A:
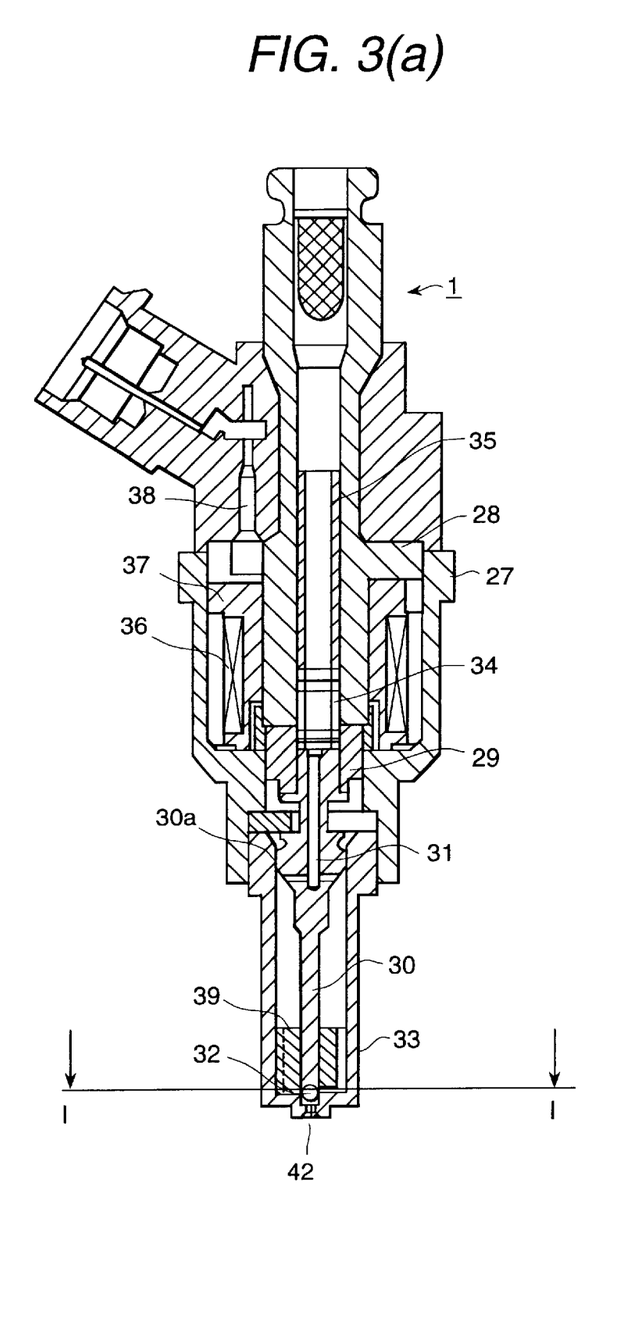
FIG. 3(a) is a longitudinal cross-sectional view showing the fuel injector of FIG. 1.

The fuel injector 1 performs injection of fuel by opening and closing a valve seat portion based on an ON-OFF signal with a duty ratio calculated by the control unit. A magnetic circuit is composed of a cylindrical yoke 27, a core 28 and a plunger 29 facing the core 28 through a gap. A rod 30 with a fuel passage 31 inside and a valve body 32 connected to the end of the rod 30 are joined to the plunger 29, and the valve body 32 performs opening and closing of a valve seat formed in a nozzle member 33.

Further, a spring 34 operating as an elastic member for pressing the valve body 32 to the valve seat surface is arranged in the center of the core 28, and a spring adjuster 35 inserted through the center of the core 28 in order to adjust the set load is arranged in the upper end of the spring 34. A coil 36 for exciting the magnetic circuit is wound around a bobbin 37, and the outer periphery is molded with a plastic material. A terminal 38 of the coil 36 is connected to a terminal of the control unit, not shown.

On the other hand, the valve body 32 is guided for smooth movement in the axial direction by a guide portion 30a, provided in the valve body 32, and an inner wall of a cylindrical fuel swirl member 39, which is inserted into a hollow portion of the nozzle member 33. The fuel swirl member 39 operates as a fuel atomizing means. In the nozzle member 33, a valve seat for seating the valve body 32 is formed downstream of the cylindrical fuel swirl member 39, and a fuel injection hole 42 for allowing fuel to pass through is formed in the center of the seat face.

Figure 3B:
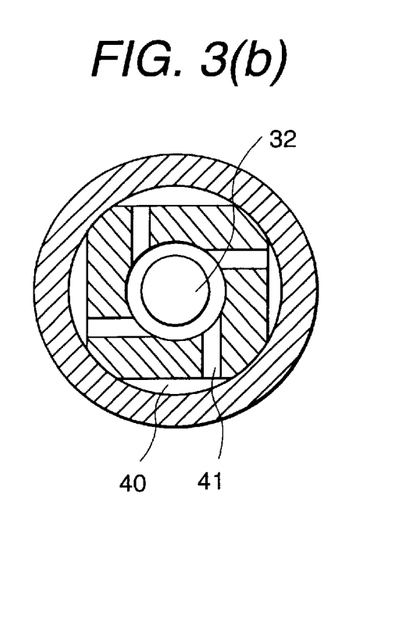
FIG. 3(b) is a transverse cross-sectional view of the fuel injector as seen on the plane of the line I—I in FIG. 3(a)

FIG. 3(b) is a cross-sectional view showing the fuel swirl member 39 of the fuel atomizing means. The fuel is introduced from the upper side of the valve body 32 so as to flow to the fuel swirl member 39. The fuel introduced from a axial passage 40 is caused to flow in a radial passage 41, which is sufficiently eccentric to the valve axis so as to sufficiently add swirl energy to the fuel. Atomizing of the fuel is further developed by forming an annular gap between the valve body 32 and the valve seat at the time of opening of the valve body 32 so as to reduce the hydrodynamic loss.

Further, the valve body 32 is operated at high speed by controlling the waveform of the current input to the coil 36, so that the valve body 32 is opened and closed in a short time to cause a rapid change in the pressure of the injected fuel during the operation. By such a construction, swirl energy sufficient to develop atomization is added to the fuel in the fuel injection hole 42. The fuel injection hole 42 is designed so that the supplied energy may be effectively discharged outside the hole. For example, the length of the hole is shortened in order to reduce the hydrodynamic loss in the axial direction of the hole.

An atomizing method other than the method of swirling the fuel can be employed, for example, a method of forming the injected fuel to have a thin-film shape so as to develop atomization by forming the injection hole portion to have a very narrow annular gap can be used.

The operation of the fuel injector 1 will be described below. The fuel injector 1 performs fuel injection control by operating the valve body 32 to open and close the valve seat according to the electric ON-OFF signal supplied to the coil 36. When the electric signal from the control unit 11 is supplied to the coil 36, a magnetic circuit is formed by the core 28, the yoke 27 and the plunger 29 to attract the plunger 29 toward the core 28 side. As the plunger 29 is moved, the valve body 32 formed together with the plunger in a one-piece construction is also moved so as to be lifted from the surface of the valve seat of the nozzle member 33 and accordingly to open the fuel injection hole 42.

The fuel is pressurized and regulated by the fuel pump and the regulator for adjusting the fuel pressure, and it flows into the fuel injector 1 and then is injected out of the fuel injection hole 42 via the inner passage 31 of the valve body 30, the outer peripheral portion of the valve body 32, and the axial passage 40 and the radial passage of the fuel swirl member 39.

The method of controlling the penetration of the fuel spray will be described below with reference to FIG. 4, FIGS. 5(a) and 5(b) and FIGS. 6(a) and 6(b). The control of penetration of the fuel spray in the fuel injector 1 of the present embodiment is adjusted by the intensity of the swirl force (swirl force) added to the injected fuel. In detail, the valve opening speed up to the full stroke of the valve body 32 is controlled. That is, when the valve opening speed is increased, the swirl force of the fuel is instantaneously increased to strengthen the swirl velocity component of the fuel and weaken the axial velocity component. Therefore, the penetration force of the fuel spray is weakened to obtain a low penetration fuel spray.

On the other hand, when the valve opening speed is decreased, the swirl force of the fuel is gradually increased, and accordingly the swirl velocity component is weak and the axial velocity component is strong during the initial stage of injection. Therefore, the penetration force of the fuel spray is strengthened so as to obtain a high penetration fuel spray.

Figure 4:
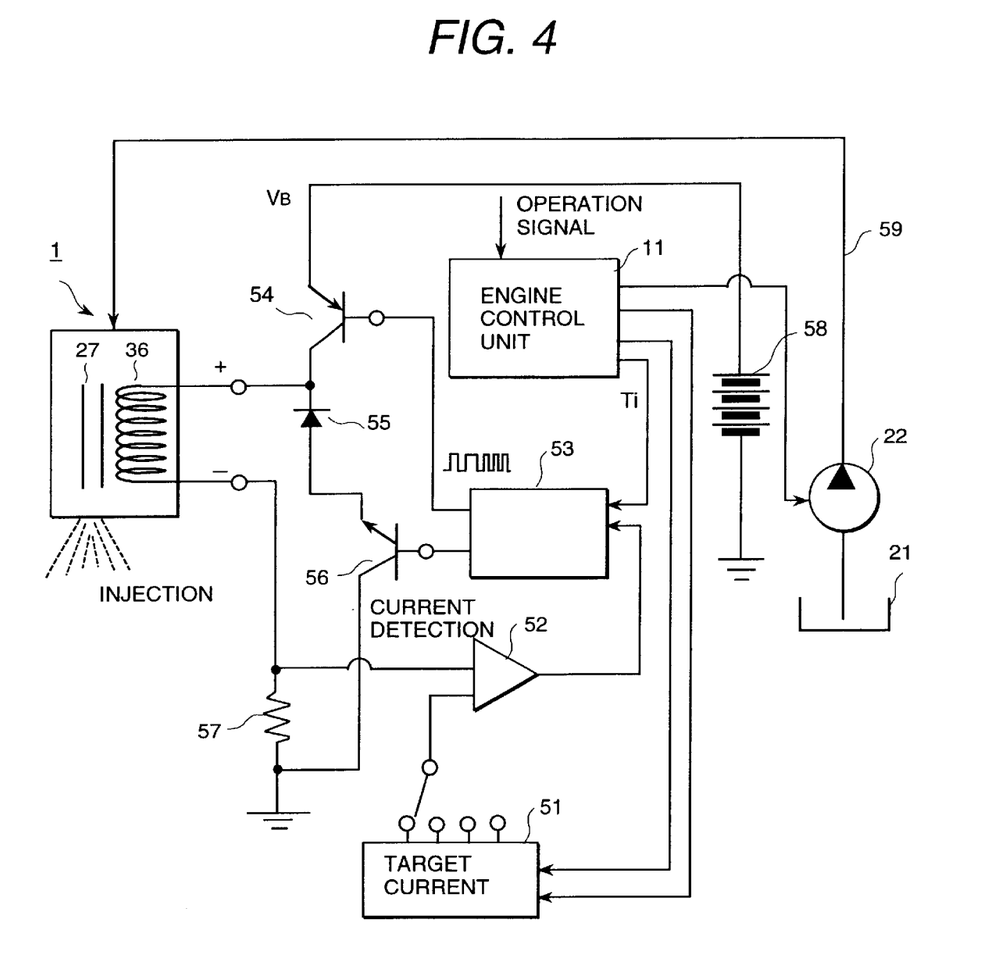
FIG. 4 is a schematic block diagram showing the construction of an embodiment of a fuel injection system in accordance with the present invention.

FIG. 4 is a block diagram showing the construction of the present embodiment of the fuel injection system. In order to control conduction of current to the coil 36, one terminal of the coil is connected to the collector of a power transistor 54 and the other terminal is grounded through a current detecting resistor 57. The coil 36 is connected in parallel to a power transistor 56 connected in series with a diode 55. The base of the power transistor 54 is connected to a current control circuit 53, and the emitter thereof is connected to a battery power source 58.

On the other hand, the base of the power transistor 56 is connected to the current control circuit 53, but the emitter thereof is connected to the coil 36 through the diode 55. Signals from the engine controller 11 and a current comparator 52 are input to the current control circuit 53, but the signal from the engine controller 11 is a command pulse signal (pulse width Ti) determined according to the operating state of the engine, and a signal from the current comparator 52 is a signal obtained by comparing a coil current an d a target current.

The current control circuit 53 operates the power transistors 54, 56 corresponding to an ignition command pulse, and the power transistor 54 produces control patterns up to a target peak current Ip by ON-OFF operation, and, after reaching the target current value, the power transistor 56 operates to repeat ON-OFF operation in order to supply a hold current that is smaller than the target current value to the coil 36.

Figure 5A:
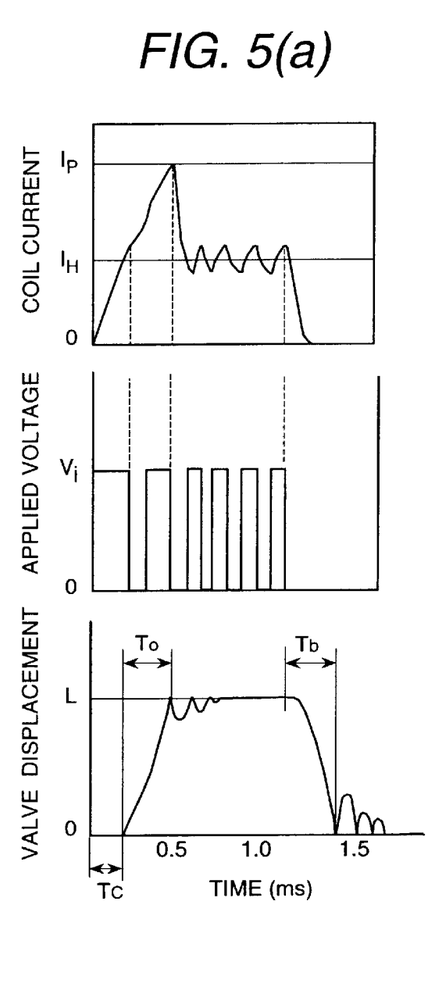
FIG. 5(a) is a chart showing a waveform of the valve behavior in a case where the engine is in a low load and low rotation speed operating state.
Figure 5B:
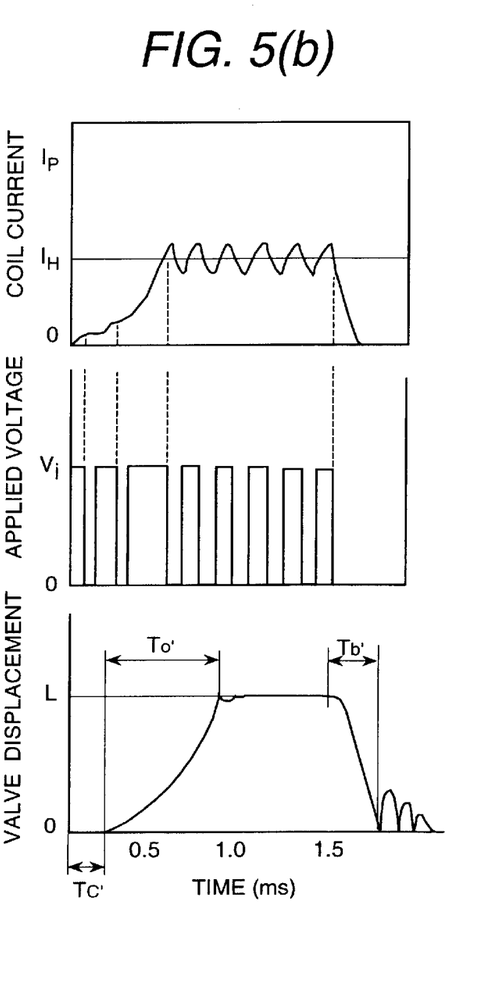
FIG. 5(b) is a chart showing a waveform of the valve behavior in a case where the engine is in a high load and high rotation speed operating state.

FIGS. 5(a) and 5(b) show input current waveforms and applied voltage waveforms for the coil 36, as well as a displacement waveform of the valve body 32.

FIG. 5(a) shows a case w here, in order to shorten the time needed to reach the target peak current value Ip, the time width of the applied voltage is changed from a large width to a small width, and then the current is switching to the hold current value Ih by repeating ON-OFF operation with a constant time interval. By such control , the displacement of the valve is rapidly raised up to the full stroke (valve opening time To) after a dead time Tc.

FIG. 5(b) shows a case where the time width of the applied voltage is controlled so as to be gradually increased from a small width to a large width so that the target peak current value may become nearly equal to the hold current value Ih. By such control, the displacement of the valve is slowly raised up to the full stroke.

The displacement of the valve shown in FIG. 5(a) causes the fuel injected from the fuel injector 1 to have the shape of low penetration fuel spray. The displacement of the valve shown in FIG. 5(b) causes the fuel injected from the fuel injector 1 to have the shape of high penetration fuel spray. In the figure, the reference character Tb indicates a time lag of closing the valve.

Figure 6A:
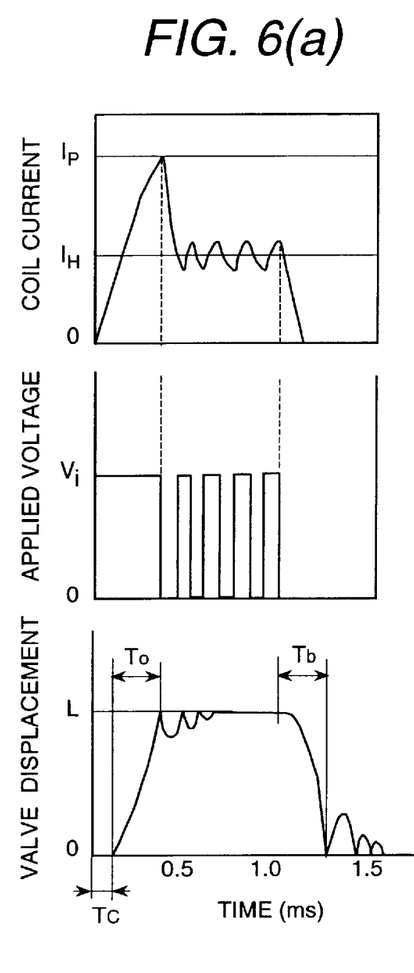
FIG. 6(a) is a chart showing another example of a waveform of the valve behavior in a case where the engine is in a low load and low rotation speed operating state.
Figure 6B:
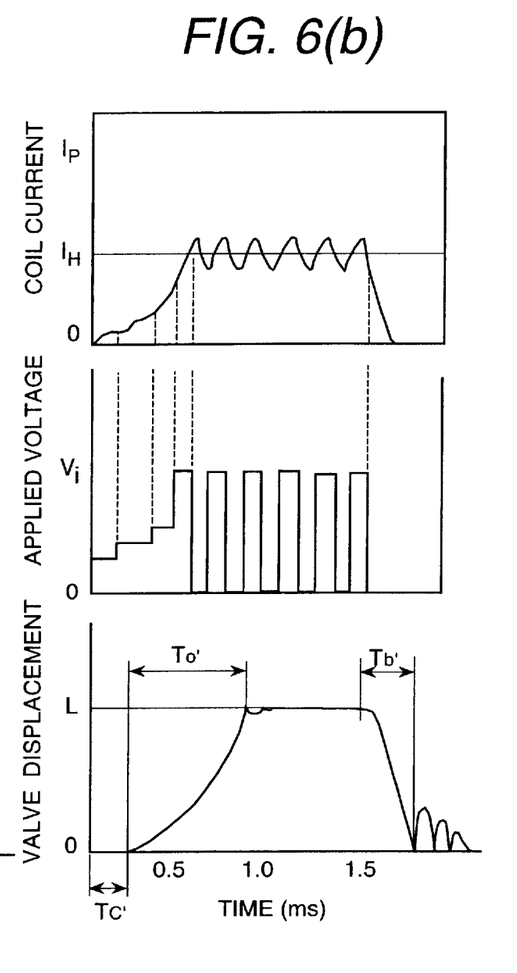
FIG. 6(b) is a chart showing a waveform of the valve behavior in a case where the engine is in a high load and high rotation speed operating state.

FIGS. 6(a) and 6(b) show another example of voltage waveforms applied to the coil 36.

FIG. 6(a) shows a method in which, in order to shorten the time needed to reach the target peak current value Ip, the applied voltage is continuously input for a preset time period, and then the current is switched to provide the hold current value Ih. This method is a peak hold method, and the actual effective voltage of the applied voltage is controlled so as to be equivalent to that of FIG. 5(a).

FIG. 6(b) shows a method in which the applied voltage is input stepwise so as to gradually reach the target hold current value Ih, and the actual effective voltage of the applied voltage is also controlled so as to be equivalent to that of FIG. 5 (b). By such control, the behavior of the valve displacement can be similar to that of the first embodiment.

In addition to the penetration control methods of the present embodiments, various changes and modifications may be made in design. For example, the swirl force of fuel can be varied by mechanically moving the fuel swirl member 39. Further, in order to shorten the time needed to reach the target peak current value Ip, the voltage applied to the coil may be increased. Therefore, for example, when a high penetration fuel spray is formed, the rise of the valve body can be made slower than that in forming a low penetration fuel spray by decreasing the applied voltage at the beginning of driving the valve body.

As described above, the present embodiment has the following functions. In the fuel injector 1 of the MPI system, since the fuel can be atomized because the fuel injector 1 uses the fuel swirl member 39, and the penetration control of the fuel spray is performed corresponding to the operating state of the internal combustion engine 100, the quality and shape of the mixed gas inside the cylinder 9 can be improved.

Further, the fuel injector 1 can inject a required injection amount of fuel in a short time at an optimum position during the intake stroke, and can form an optimum mixed gas in the combustion chamber 26 by eliminating time lag.

Furthermore, since the internal combustion engine 100 has the swirl control valve 10a for accelerating the air flow velocity in the intake manifold 18, and since the fuel spray from the fuel injector 1 is a low penetration fuel spray relative to the velocity of accelerated air flow in the intake manifold 18, the problems of the injected fuel attaching onto the wall surface and of the transport time lag of the fuel due to atomization can be solved.

According to the present invention, since the penetration force of the fuel spray is varied by changing the displacement speed of the valve body, the penetration force of the fuel spray can be controlled without a large change in the structure of the fuel injector.

Further, when the penetration force of the fuel spray is varied, the transport time lag of the fuel spray can be reduced by changing the intake air velocity flowing in the intake manifold.

What is claimed is:

1. A fuel injection system for an internal combustion engine comprising a fuel injector for injecting fuel, said fuel injector having a fuel passage adding a swirl force to the fuel, said fuel injector being opened by driving a valve body toward a direction apart from a valve seat; and a controller for controlling driving of said valve body, wherein said controller controls driving of said valve body so that a rising speed of said valve body at valve opening may be slower when the internal combustion engine is operated in a high load and high rotation speed state than when the internal combustion engine is operated in a low load and low rotation speed state.

2. A fuel injection system for an internal combustion engine comprising a fuel injector for injecting fuel, said fuel injector having a fuel passage adding a swirl force to the fuel, said fuel injector being opened by driving a valve body toward a direction apart from a valve seat; and a controller for controlling driving of said valve body, wherein said controller controls driving of said valve body so that a time required until said valve body is moved from a closed state by a preset stroke to be opened may be longer when the internal combustion engine is operated in a high load and high rotation speed state than when the internal combustion engine is operated in a low load and low rotation speed state.

3. A fuel injection system for an internal combustion engine according to any one of claims 1 and 2, wherein said fuel injector is an electromagnetic valve which drives the valve body by switching voltage applied to a coil among a plurality of voltage values to vary an electromagnetic force, and said controller controls a voltage applying time period from a time point of switching the voltage from a first voltage value to a second voltage value in order to drive said valve body toward the valve opening direction to a time point of again switching the voltage applied to the coil to said first voltage value while said valve body is being moved from a closed state by a preset stroke to be opened so that the voltage applying time period in the following time may be longer than the voltage applying time period in the preceding time when the internal combustion engine is operated in a high load and high rotation speed state, and so that the voltage applying time period in the following time may be shorter than the voltage applying time period in the preceding time when the internal combustion engine is operated in a low load and low rotation speed state.

4. A fuel injection system for an internal combustion engine according to any one of claims 1 and 2, wherein said fuel injector is an electromagnetic valve which drives the valve body by switching voltage applied to a coil among a plurality of voltage values to vary an electromagnetic force, and said controller controls a voltage applying time period from a time point of switching the voltage from a first voltage value to a second high voltage value in order to drive said valve body toward the valve opening direction to a time point of again switching the voltage applied to the coil to said first voltage value so that the voltage applying time period in the first time may be shorter when the internal combustion engine is operated in a high load and high rotation speed state than when the internal combustion engine is operated in a low load and low rotation speed state.

5. A fuel injection system for an internal combustion engine according to any one of claims 1 and 2, wherein said fuel injector is an electromagnetic valve which drives the valve body by switching voltage applied to a coil among a plurality of voltage values to vary an electromagnetic force, and said controller controls a magnitude of voltage varied in order to drive said valve body toward the valve opening direction while said valve body is being moved from a closed state by a preset stroke so that the magnitude of the varied voltage in the following time may be larger than the magnitude of the varied voltage in the preceding time when the internal combustion engine is operated in a high load and high rotation speed state, and so that the magnitude of the varied voltage in the following time may be smaller than the magnitude of the varied voltage in the preceding time when the internal combustion engine is operated in a low load and low rotation speed state.

6. A fuel injection system for an internal combustion engine according to any one of claims 1 and 2, wherein said fuel injector is an electromagnetic valve which drives the valve body by switching voltage applied to a coil among a plurality of voltage values to vary an electromagnetic force, and said controller controls a magnitude of voltage varied in order to drive said valve body toward the valve opening direction so that the magnitude of the varied voltage in the first time may be smaller when the internal combustion engine is operated in a high load and high rotation speed state than when the internal combustion engine is operated in a low load and low rotation speed state.

7. A fuel injection system for an internal combustion engine injecting fuel inside an air intake passage for conveying air into a cylinder of said internal combustion engine, said fuel injection system injecting the fuel by varying a penetration force of the fuel corresponding to an operating state of said internal combustion engine, which comprises:

a movable member arranged inside said intake air passage in an upstream side of a position where fuel spray is injected and in a downstream side of a position where a throttle valve is located, said movable member being driven so that an area of said movable member projected on the cross section of said intake air passage may be varied; and a controller controlling said area of said movable member projected on the cross section of said intake air passage so as to be smaller when the internal combustion engine is operated in a high load and high rotation speed state than when the internal combustion engine is operated in a low load and low rotation speed state.

8. A fuel injection system for an internal combustion engine according to claim 7, wherein said penetration force during a low load and low rotation speed state is made smaller than said penetration force during a high load and high rotation speed state.

9. A fuel injection system according to claim 7, wherein said movable member closes approximately one-half of the total area of the intake air passage in the low load and low rotation speed state.

10. A fuel injection system for an internal combustion engine injecting fuel inside an air intake passage for conveying air into a cylinder of said internal combustion engine, said fuel injection system injecting the fuel by varying a penetration force of the fuel corresponding to an operating state of said internal combustion engine, which comprises:

an opening-and-closing device arranged inside said intake air passage in an upstream side of a position where fuel spray is injected and in a downstream side of a position where a throttle valve is located, said opening-and-closing device opening and closing part of a cross-sectional area of said intake air passage; and a controller controlling said opening-and-closing device so that said cross-sectional area of said intake air passage is made to be larger when the internal combustion engine is operated in a high load and high rotation speed state than when the internal combustion engine is operated in a low load and low rotation speed state.

11. A fuel injection system for an internal combustion engine according to claim 10, wherein said penetration force during a low load and low rotation speed state is made smaller than said penetration force during a high load and high rotation speed state.

12. A fuel injection system according to claim 10, wherein said opening and closing device closes approximately one-half of the total area of the air intake passage in the low load and low rotation speed state.

13. A fuel injection system for an internal combustion engine injecting fuel inside an air intake passage for conveying air into a cylinder of said internal combustion engine, said fuel injection system injecting the fuel by varying a penetration force of the fuel corresponding to an operating state of said internal combustion engine, wherein one selected from a particle size of the fuel and said penetration force of the fuel is varied by a movable member, located inside said air intake passage in an upstream side of a position where fuel spray is injected and in a downstream side of a position where a throttle valve is located, in accordance with at a low speed and at a high speed of the internal combustion engine.

14. A fuel injection system for an internal combustion engine according to claim 13, wherein said one selected from a particle size of the fuel and said penetration force of the fuel is varied in accordance with a fuel pressure of the fuel.

15. A fuel injection system for an internal combustion engine according to claim 13, wherein said penetration force during a low load and low rotation speed state is made smaller than said penetration force during a high load and high rotation speed state.

16. A fuel injection system according to claim 13, wherein the movable member closes approximately one-half of the total area of the air intake passage at the low speed of the internal combustion engine.

* * * * *